(12) United States Patent
Fujioka

(10) Patent No.: US 9,869,347 B2
(45) Date of Patent: Jan. 16, 2018

(54) SLIDE GUIDE UNIT AND SURVEYING INSTRUMENT

(71) Applicant: TOPCON Corporation, Tokyo-to (JP)

(72) Inventor: Takayuki Fujioka, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 114 days.

(21) Appl. No.: 15/094,221

(22) Filed: Apr. 8, 2016

(65) Prior Publication Data

US 2016/0319864 A1 Nov. 3, 2016

(30) Foreign Application Priority Data

Apr. 28, 2015 (JP) ................................. 2015-091360

(51) Int. Cl.
*G01C 15/00* (2006.01)
*F16C 29/00* (2006.01)
*F16C 29/04* (2006.01)

(52) U.S. Cl.
CPC .......... *F16C 29/004* (2013.01); *F16C 29/005* (2013.01); *F16C 29/04* (2013.01); *G01C 15/00* (2013.01); *G01C 15/004* (2013.01)

(58) Field of Classification Search
CPC ...... F16C 29/004; F16C 29/005; F16C 29/04; G01C 15/004; G01C 15/00
USPC .................................................. 33/290, 299
See application file for complete search history.

(56) References Cited

U.S. PATENT DOCUMENTS

| 5,485,266 A * | 1/1996 | Hirano | G01B 11/26 33/281 |
|---|---|---|---|
| 5,636,018 A * | 6/1997 | Hirano | G01B 11/26 33/291 |
| 5,784,155 A * | 7/1998 | Ohtomo | G01C 15/004 356/141.1 |
| 7,398,699 B2 * | 7/2008 | Itomi | G01D 5/165 33/1 N |
| 7,796,351 B2 | 9/2010 | Fujioka et al. | |
| 2006/0150430 A1 * | 7/2006 | Boge | F16B 5/0225 33/300 |
| 2006/0162176 A1 * | 7/2006 | Lummes | G01B 3/008 33/556 |

(Continued)

FOREIGN PATENT DOCUMENTS

JP 2009-122012 A 6/2009

*Primary Examiner* — G. Bradley Bennett
(74) *Attorney, Agent, or Firm* — Nields, Lemack & Frame, LLC

(57) ABSTRACT

There is provided a slide guide unit comprising; a guide base having V-grooves formed on both the side end faces in parallel, a slide block having a facing surface facing one of the V-grooves on both the side ends, conical recesses formed at two positions on the facing surface facing the one V-groove with a predetermined interval, first steel balls fitted in the conical recesses and fitted in the one V-groove, a steel ball support plate with spring action as disposed on a side surface of the slide block on the other V-groove side and a necessary number of second steel balls as fitted in a steel ball holding groove and the other V-groove, wherein the steel ball support plate has the steel ball holding groove facing the other V-groove, wherein the steel ball support plate presses the second steel balls to the other V-groove and the slide block is movable along the one V-groove side and the other V-groove side via the first steel balls and the second steel balls.

18 Claims, 5 Drawing Sheets

(56) References Cited

U.S. PATENT DOCUMENTS

| | | | |
|---|---|---|---|
| 2007/0089309 A1* | 4/2007 | Kodaira | G01C 15/002 33/290 |
| 2009/0128930 A1* | 5/2009 | Fujioka | F16C 11/069 359/822 |
| 2016/0003603 A1* | 1/2016 | Kawakami | G01B 5/0009 33/503 |
| 2016/0281777 A1* | 9/2016 | Nara | F16C 29/063 |
| 2016/0319864 A1* | 11/2016 | Fujioka | G01C 15/00 |
| 2017/0276174 A1* | 9/2017 | Greiner | F16C 29/005 |

\* cited by examiner

SLIDE GUIDE UNIT AND SURVEYING INSTRUMENT

BACKGROUND OF THE INVENTION

The present invention relates to a slide guide unit for supporting a slider with high accuracy and a surveying instrument using the slide guide unit.

In a precision machine which requires a highly accurate positioning, for instance, a surveying instrument, a high accuracy of several seconds is required for setting a tilt angle. For instance, in a laser surveying instrument which projects a laser beam for measurement and performs an angle measurement and a distance measurement, a tilt of a laser luminescence device which projects a laser beam needs to be set in a unit of several seconds.

As a mechanism for setting the tilt of the laser luminescence device, there is a mechanism which tilts the laser luminescence device by giving a linear displacement to an arm extending from the laser luminescence device and converts the linear displacement into a tilt angle of the laser luminescence device.

In the tilt setting mechanism as described above, a slider as linearly movably supported is coupled with the laser luminescence device and a displacement is given to the slider by an actuator such as a motor or the like.

In order to perform an angle setting with high accuracy, the slider needs to accurately follow the displacement given by the actuator. However, when there is a looseness between the slider and a slider support portion which supports the slider, the displacement given by the actuator is not accurately transmitted to the slider and an error occurs.

It is to be noted that Japanese Patent Application Publication No. 2009-122012 discloses a mechanism for setting a tilt of a laser luminescence device.

SUMMARY OF THE INVENTION

It is an object of the present invention to provide a slide guide unit by which a looseness does not occur between a slider and a slider support portion for supporting the slider and a surveying instrument using the slide guide.

To attain the object as described above, a slide guide unit according to the present invention comprises a guide base having V-grooves formed on both the side end faces in parallel, a slide block having a facing surface facing one of the V-grooves on both the side ends, conical recesses formed at two positions on the facing surface facing the one V-groove with a predetermined interval, first steel balls fitted in the conical recesses and fitted in the one V-groove, a steel ball support plate with spring action as disposed on a side surface of the slide block on the other V-groove side and a necessary number of second steel balls as fitted in a steel ball holding groove and the other V-groove, wherein the steel ball support plate has the steel ball holding groove facing the other V-groove, wherein the steel ball support plate presses the second steel balls to the other V-groove and the slide block is movable along the one V-groove side and the other V-groove side via the first steel balls and the second steel balls.

Further, in the slide guide unit according to the present invention, the steel ball holding groove has folding pieces for preventing from falling at both the ends of the groove and the second steel balls are provided in the steel ball holding groove in an appressed state or a substantially appressed state.

Further, in the slide guide unit according to the present invention, the steel ball holding groove has folding pieces for preventing from falling at both the ends of the groove, a compression spring is provided between the second steel balls and the second steel balls are provided in the steel ball holding groove in an appressed state by a force of the compression spring.

Further, in the slide guide unit according to the present invention, the steel ball support plate is fixed to the slide block by a fixing bolt which is positioned at a position away from the steel ball holding groove and an adjusting bolt which is positioned at a position close to the steel ball holding groove, the steel ball support plate presses the second steel balls to the other V-groove and a pressing force of the steel ball support plate is adjusted by the adjusting bolt.

Further, in the slide guide unit according to the present invention, a linear position detector is provided on a surface of the guide base facing the slide block, a light emitting element for emitting a detection light to the linear position detector is provided on the slide block and a relative position of a slider unit with respect to a guide unit is detected based on a detection result of the detection light of the linear position detector.

Furthermore, a surveying instrument according to the present invention is a surveying instrument which projects a laser beam in rotary irradiation and forms a laser reference plane, comprising a tilt setting device for setting a tilt angle of the laser reference plane, wherein the tilt setting device comprises a two-axial tilt unit which is tiltable in horizontal two directions and has tilt sensors which detect a horizontality of the horizontal two directions, two tilt setting arms extending from the two-axial tilt unit in the horizontal two directions and one of the slide guide units according to claims 1 to 5 which engages with the tilt setting arms respectively, and wherein each slide guide unit is configured to displace the engaged tilt setting arms in a vertical direction and set the tilt setting arms to a predetermined tilt.

According to the present invention, a slide guide unit comprises a guide base having V-grooves formed on both the side end faces in parallel, a slide block having a facing surface facing one of the V-grooves on both the side ends, conical recesses formed at two positions on the facing surface facing the one V-groove with a predetermined interval, first steel balls fitted in the conical recesses and fitted in the one V-groove, a steel ball support plate with spring action as disposed on a side surface of the slide block on the other V-groove side and a necessary number of second steel balls as fitted in a steel ball holding groove and the other V-groove, wherein the steel ball support plate has the steel ball holding groove facing the other V-groove, wherein the steel ball support plate presses the second steel balls to the other V-groove and the slide block is movable along the one V-groove site and the other V-groove side via the first steel balls and the second steel balls. As a result, the slide block can be displaced with high accuracy with the one of the V-groove of the guide base as a reference.

Further, according to the present invention, in the slide guide unit, the steel ball holding groove has folding pieces for preventing from failing at both the ends of the groove and the second steel balls are provided in the steel ball holding groove in an appressed state or a substantially appressed state. As a result, the second steel balls slide in the other V-groove without substantially rotating and the slide block is displaced with high accuracy with the one of the V-groove as a reference.

Further, according to the present invention, in the slide guide unit, the steel ball holding groove has folding pieces for preventing from falling at both the ends of the groove, a compression spring is provided between the second steel balls and the second steel balls are provided in the steel ball holding groove in an appressed state by a force of the compression spring. As a result, the second steel balls slide in the other V-groove without rotating and the slide block is displaced with high accuracy with the one of the V-groove as a reference.

Further, according to the present invention, in the slide guide unit, the steel ball support plate is fixed to the slide block by a fixing bolt which is positioned at a position away from the steel ball holding groove and an adjusting bolt which is positioned at a position close to the steel ball holding groove, the steel ball support plate presses the second steel balls to the other V-groove and a pressing force of the steel ball support plate is adjusted by the adjusting bolt. As a result, a resistance produced when the second steel balls slide in the other V-groove can be reduced and an optimum state can be obtained.

Further, according to the present invention, in the slide guide unit, a linear position detector is provided on a surface of the guide base facing the slide block, a light emitting element for emitting a detection light to the linear position detector is provided on the slide block and a relative position of a slider unit with respect to a guide unit is detected based on a detection result of the detection light of the linear position detector. As a result, a highly accurate positional detection can be performed without being affected by a looseness between the guide base and the slide block.

Furthermore, according to the present invention, a surveying instrument is a surveying instrument which projects a laser beam in rotary irradiation and forms a laser reference plane, comprising a tilt setting device for setting a tilt angle of the laser reference plane, wherein the tilt setting device comprises a two-axial tilt unit which is tiltable in horizontal two directions and has tilt sensors which detect a horizontality of the horizontal two directions, two tilt setting arms extending from the two-axial tilt unit in the horizontal two directions and one of the slide guide units according to claims 1 to 5 which engages with the tilt setting arms respectively, and wherein each slide guide unit is configured to displace the engaged tilt setting arms in a vertical direction and set the tilt setting arms to a predetermined tilt. As a result, a tilt of the laser reference plane can be set with high accuracy.

DETAILED DESCRIPTION OF THE PREFERRED EMBODIMENT

Figure 1:
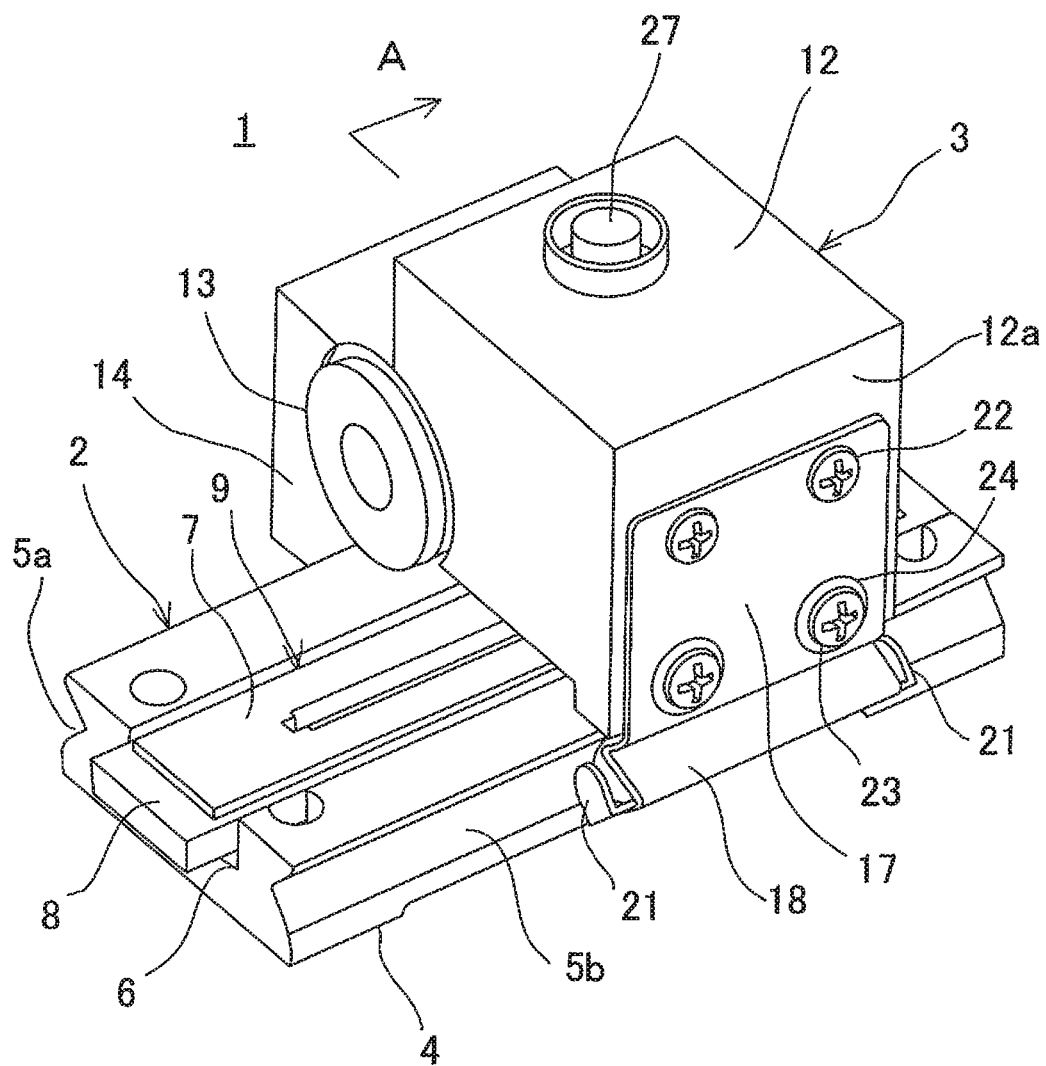
FIG. 1 is a perspective view according to an embodiment of the present invention from above a slide guide unit.
Figure 2:
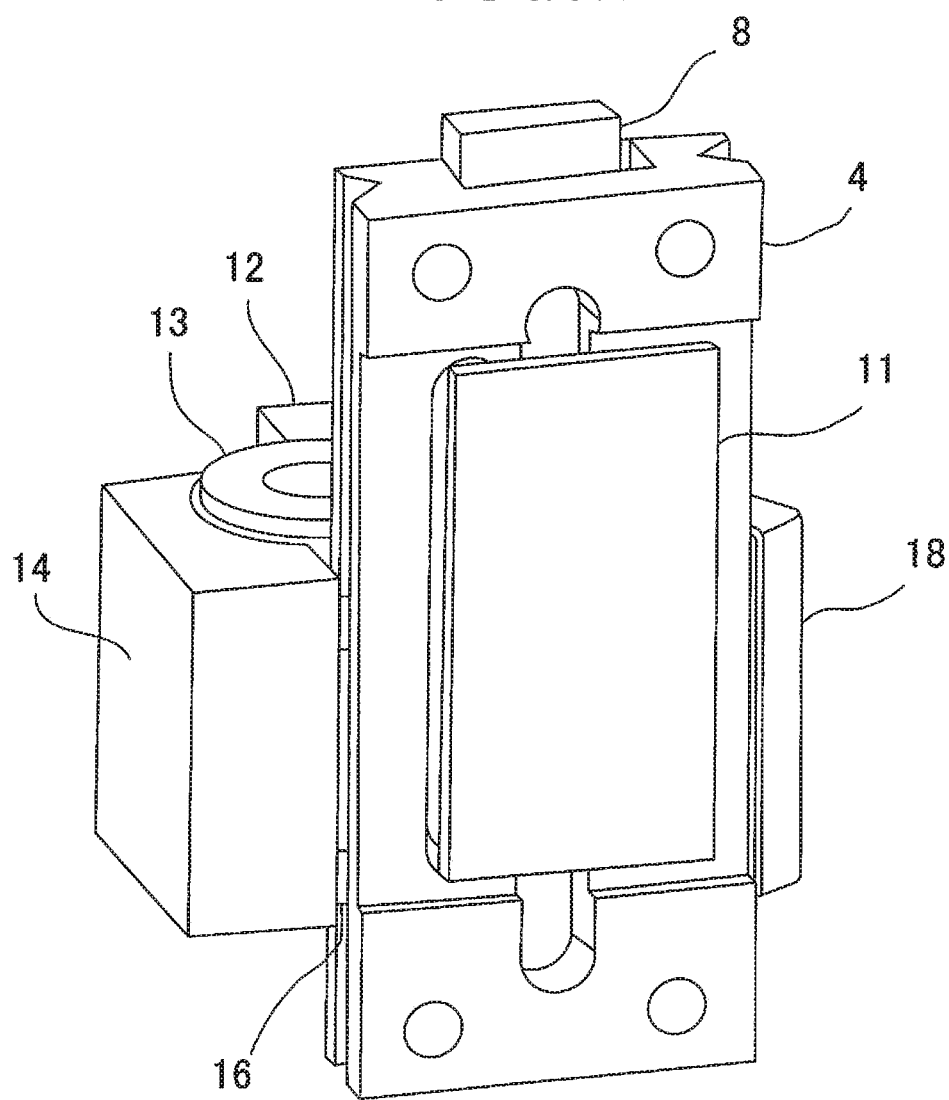
FIG. 2 is a perspective view from below the slide guide unit.

A description will be given below on an embodiment of the present invention by referring to the attached drawings.

A description will be given on a slide guide unit 1 according to an embodiment of the present invention by referring to FIG. 1 to FIG. 5.

The slide guide unit 1 comprises a guide unit 2 and a slider unit 3.

The guide unit 2 has a guide base 4 made of a flat plate in a rectangular shape, V-grooves 5a and 5b are formed on both the side end faces of the guide base 4 and a recessed portion 6 extending parallel to the V-grooves 5a and 5b is formed at a middle of an upper surface of the guide base 4.

A linear position detector 9 as consisted of a linear scale 7 and a linear sensor 8 is provided in the recessed portion 6. Further, an arithmetic unit 11 for calculating a position based on a signal from the linear sensor 8 is provided on a bottom surface of the guide base 4.

The slider unit 3 is provided so as to be movable along the V-grooves 5a and 5b of the guide unit 2.

The slider unit 3 has a slide block 12 and a nut portion 13 with an axis parallel to the V-grooves 5a and 5b is provided on the slide block 12. A screw rod (not shown) is rotatably screwed with the nut portion 13, and further, the screw rod is connected to a motor (not shown). By rotating the screw rod by the motor, the slider unit 3 is configured so as to move forwards and backwards.

Further, the slide block 12 has a leg portion 14 which is formed so as to face one of the V-grooves 5a and 5b, i.e., the V-groove 5a. Conical recesses 15 are formed on a facing surface 14a of the leg portion 14 facing the V-grove 5a and at both the ends of the facing surface 14a.

Steel balls 16 are fitted in the conical recesses 15 respectively, and further, the steel balls 16 are also fitted in the V-groove 5a.

A steel ball support plate 17 is provided on a side surface 12a positioned on the opposite side of the leg portion 14 of the slide block 12. The steel ball support plate 17 is made of a material with spring action such as a steel plate or a stainless steel plate or the like and a steel ball holding groove 18 is formed at a lower end portion of the steel ball support plate 17. The steel ball holding groove 18 is a V-groove shape, faces the V-groove 5b and is parallel to the V-groove 5b.

Steel balls 19 are fitted between the steel ball holding groove 18 and the V-groove 5b. A necessary number of the steel balls 19 is, e.g., five and the steel balls 19 are configured to be prevented from falling from the steel ball holding groove 18 by folding pieces 21 formed at both end portions of the steel ball holding groove 18. Further, a state where the steel balls 19 are provided is such a manner that a gap is occurred between the steel balls 19 in a range of a working tolerance and the steel balls 19 are preferably appressed against each other without a gap.

The steel ball support plate 17 is fixed at an upper end portion of the steel ball support plate 17 by two fixing bolts 22. Further, the steel ball support plate 17 is fixed by two adjusting bolts 23 at positions below the fixing bolts 22 and corresponding to a lower end portion of the slide block 12.

The fixing bolts 22 completely fix the upper end portion of the steel ball support plate 17. The adjusting bolts 23 fix the steel ball support plate 17 so that a gap slightly exists between the steel ball support plate 17 and the slide block 12. A locking washer 24 is interposed between the adjusting bolts 23 and the steel ball support plate 17.

Thus, the steel ball support plate 17 acts as a plate spring which presses the steel balls 19 to the V-groove 5b and a pressing force can be adjusted by the adjusting bolts 23.

When the steel ball support plate 17 presses the steel balls 19 to the V-groove 5b, the pressing force is transmitted to the steel balls 16 via the guide base 4 and the steel balls 16 are pressed to the conical recesses 15. In a state where the steel balls 16 are pressed to the conical recesses 15, a displacement in an axial direction of the conical recesses 15 and two directions perpendicularly crossing with respect to the axial direction (three axial directions) is restrained.

Therefore, a positional relation between the guide base 4 and the slide block 12 is determined with the leg portion 14 as a reference (that is, with the steel balls 16 fitted in the conical recesses 15 as a reference). It is to be noted that each of the steel balls 16 and the steel balls 19 has a high degree of roundness and a highly hard and smooth spherical surface and steel balls as commercially available can be used.

A lubricating oil is appropriately fed or applied to the V-grooves 5a and 5b and the slider unit 3 can smoothly move with respect to the guide base 4.

A position detection pattern 25 is provided on a bottom surface of the slider unit 3, i.e., a surface facing an upper face of the guide base 4. A light projection hole 26 with an axis vertical with respect to the position detection pattern 25 is formed in the slider unit 3 and the light projection hole 26 has a tapered shape with its diameter gradually increasing downwards.

A light emitting element (for instance, a light emitting diode) 27 is provided at an upper end of the light projection hole 26 and an optical axis of the light emitting element 27 coincides with an axis of the light projection hole 26. When the light emitting element 27 is turned on and a detection light is emitted, the detection light is passed through the position detection pattern 25 and a pattern image is projected onto the linear scale 7.

A description will be given below on an operation of the slide guide unit 1.

The steel balls 16 are fitted between the conical recesses 15 and the V-groove 5a and the steel balls 19 are fitted between the steel ball holding groove 18 and the V-groove 5b. When the steel balls 16 and the steel balls 19 slide in the V-grooves 5a and 5b, the slide block 12 moves with respect to the guide base 4.

The steel balls 16 are fitted in the conical recesses 15, and further, the steel balls 19 are appressed against or substantially appressed against each other. Therefore, when the guide base 4 moves, the steel balls 16 and the steel balls 19 do not substantially rotate and the steel balls 16 and the steel balls 19 slide with respect to the V-grooves 5a and 5b without rotating. Further, since each of the steel balls 16 and the steel balls 19 has the highly hard and smooth spherical surface and the lubricating oil is applied to the V-grooves 5a and 5b, a smooth movement with high linearity and less resistance is realized.

Further, the steel balls 16 are fitted in the conical recesses 15 and the steel balls 16 becomes a reference for a position between the guide base 4 and the slide block 12. Further, since the steel balls 16 are pressed to the conical recesses 15, no gap is occurred and a looseness is not occurred either.

Therefore, the slide block 12 smoothly moves along the V-groove 5a with the high linearity. Further, since no gap is occurred between the V-groove 5a, the steel balls 16 and the conical recesses 15, which becomes a reference for a movement of the slide block 12, a positional accuracy and a posture accuracy of the slide block 12 with respect to the guide base 4 are determined by a finishing accuracy of the V-groove 5a. Therefore, even if a distance between the two steel balls 16 is small, a highly accurate guide function is exerted. Therefore, the slide guide unit 1 can be miniaturized.

Next, by turning on the light emitting element 27, the detection light passing through the position detection pattern 25 and the linear scale 7 is detected by the linear sensor 8.

When the slide block 12 moves, a projecting position of the position detection pattern 25 to the linear scale 7 moves and a position of the position detection pattern 25 which is passed through the linear scale 7 and projected onto the linear sensor 8 also changes.

The linear sensor 8 detects the position detection pattern 25 and emits a photodetection signal to the arithmetic unit 11. The arithmetic unit 11 calculates a position of the slider unit 3 with respect to the guide unit 2 based on the photodetection signal.

Feeding back a calculation result of the arithmetic unit 11 to a driving of a motor (not shown), which rotates the screw rod, a highly accurate positioning can be performed.

Figure 4:
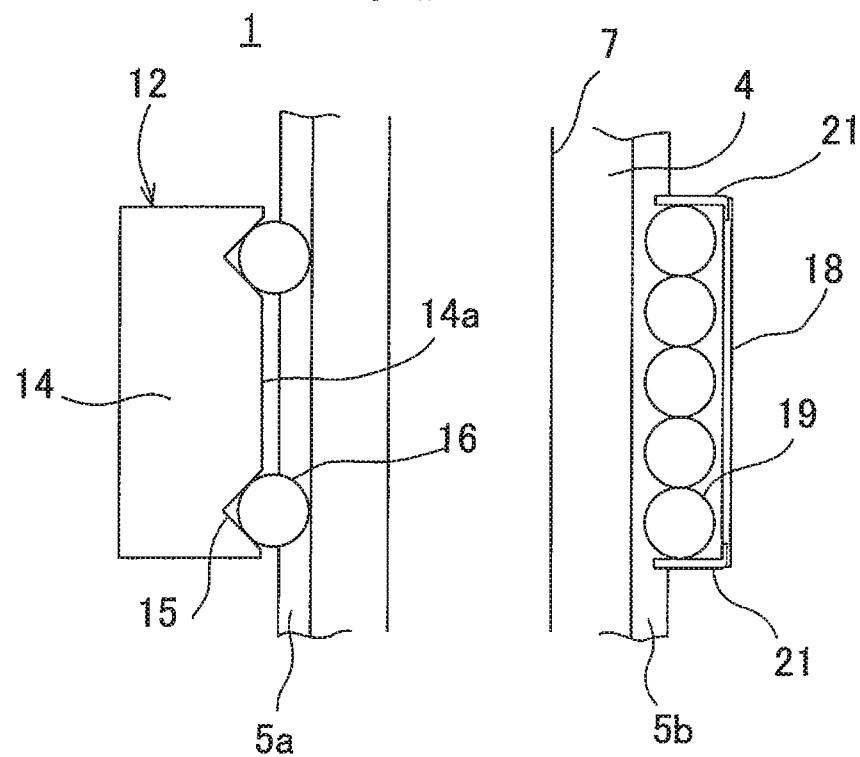
FIG. 4 is an arrow diagram along the line B-B in FIG. 3.
Figure 5:
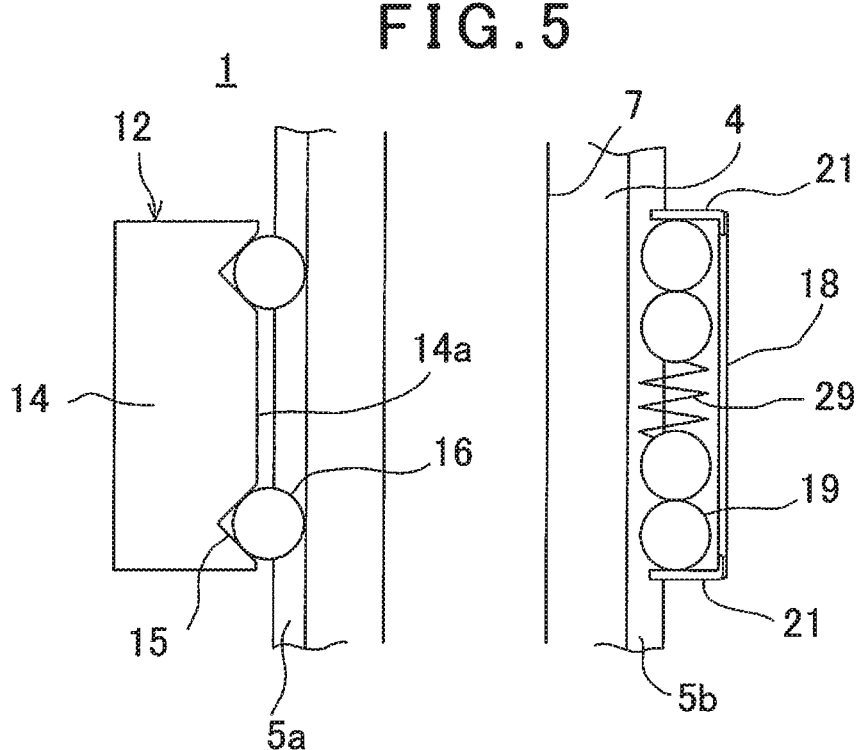
FIG. 5 is an equivalent arrow diagram along the line B-B in FIG. 3.

FIG. 5 shows a slide guide unit according to another embodiment of the present invention. In FIG. 5, the same component as shown in FIG. 4 is referred by the same symbol.

Figure 3:
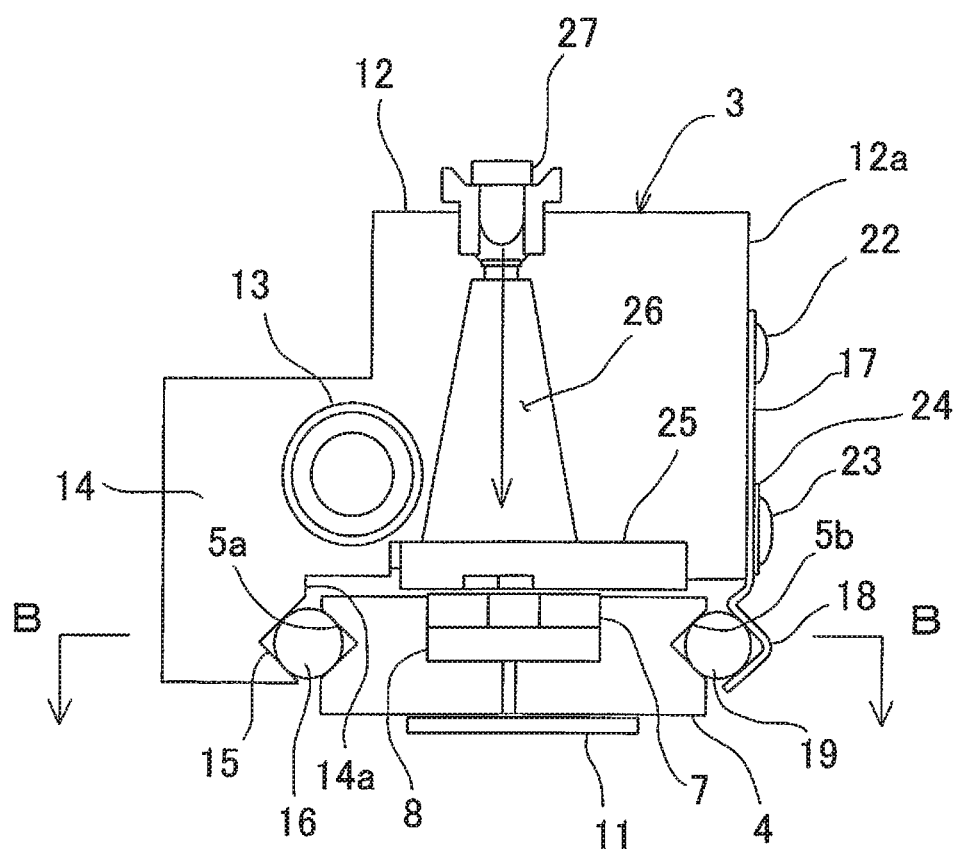
FIG. 3 is an arrow diagram A in FIG. 1.

FIG. 5 shows a relation between a guide base 4 and a slide block 12 according to another embodiment and is an equivalent arrow diagram along the line B-B in FIG. 3.

In the another embodiment, the number of steel balls 19 accommodated in a steel ball holding groove 18 is reduced by one. A compression spring 29 is provided in the middle of the four steel balls 19 and the steel balls 19 are biased in a separating direction by the compression spring 29.

By providing the compression spring 29, even if a machining error or the like exists between the folding pieces 21 and the accommodated steel balls 19, a gap can be prevented from occurring between the folding pieces 21 and the steel balls 19.

Next, in FIG. 6, a description will be given on a surveying instrument 31 using the slide guide unit 1 as described above.

Figure 6:
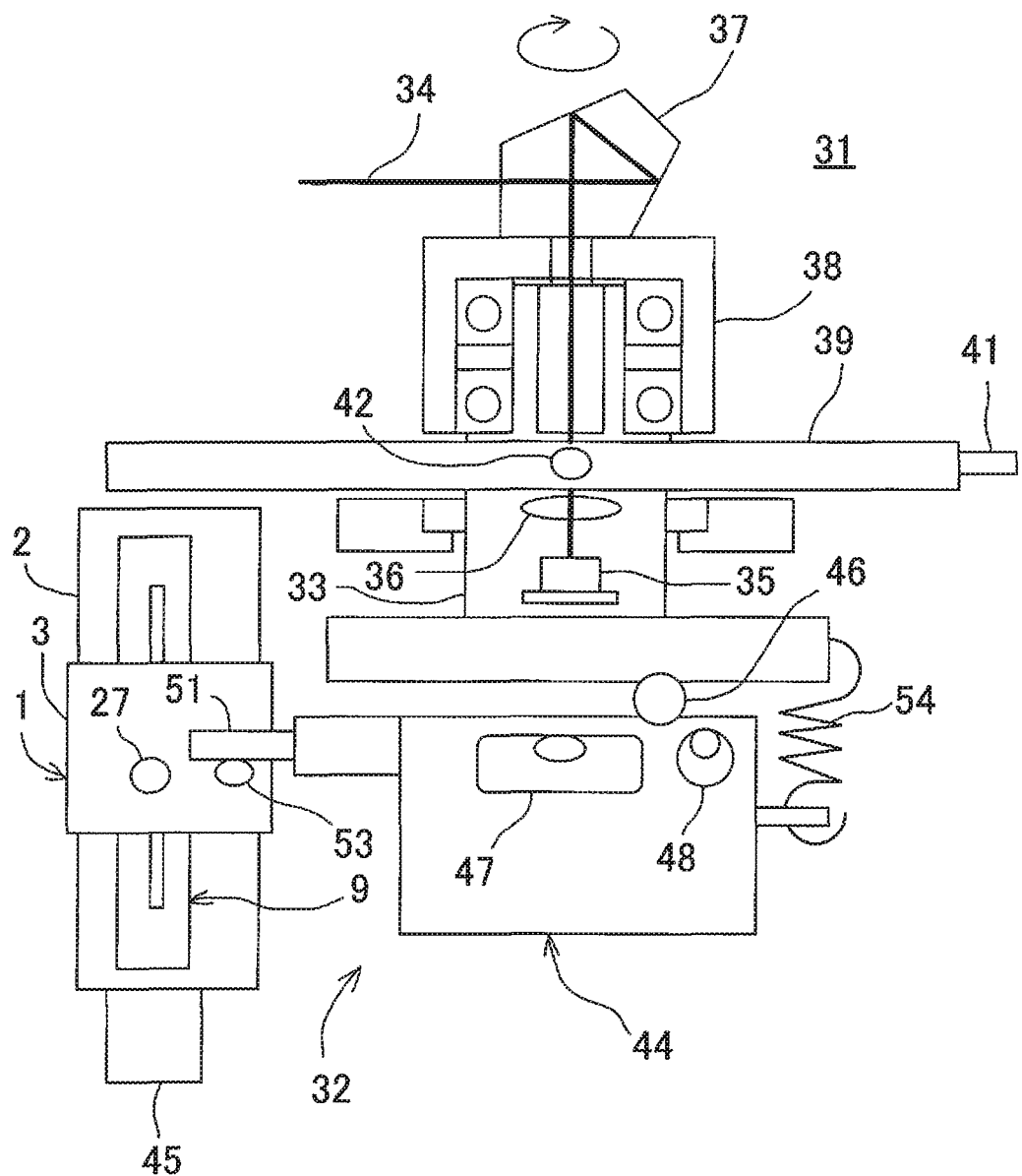
FIG. 6 is a schematical block diagram of a surveying instrument comprising the slide guide unit.

In FIG. 6, the slide guide unit 1 is used in a tilt setting device 32.

A description will be given on the schematics of the surveying instrument 31.

The surveying instrument 31 is a rotary laser device for forming a laser reference plane which is one of surveying instruments.

The surveying instrument 31 has a laser luminescence device 33 and a light emitting element 35 is accommodated in the laser luminescence device 33.

A laser beam 34 is emitted by the light emitting element 35, turned to parallel luminous fluxes by a projecting optical system 36 and deflected in a horizontal direction by a pentagonal prism 37 as a deflection optical member.

The pentagonal prism 37 is provided on a rotary projecting unit 38, and when the rotary projecting unit 38 is rotated, the laser beam 34 is projected in rotary irradiation and it is so arranged that the laser reference plane is formed by the laser beam 34.

The laser luminescence device 33, the rotary projecting unit 38, the tilt setting device 32 and the like are provided on a main unit frame 39 and are configured so as to tilt integrally with the main unit frame 39.

Further, the main unit frame 39 has two axes perpendicularly crossing, i.e., an X-axis 41 and a Y-axis 42, and is configured so as to tilt with the X-axis 41 as a center, and further, tilt with the Y-axis 42 as a center.

The tilt setting device 32 includes a two-axial tilt unit 44, the slide guide unit 1 and a tilt setting motor 45 for driving the slide guide unit 1.

The two-axial tilt unit 44 can tilt in two directions of an X-direction and a Y-direction with respect to the main unit frame 39 with a tilt fulcrum 46 as a center. Further, the two-axial tilt unit 44 has an X-direction tilt sensor 47 for detecting a tilt in the X-direction and a Y-direction tilt sensor 48 for detecting a tilt in the Y-direction and the X-direction tilt sensor 47 and the Y-direction tilt sensor 48 detect a horizontality in each direction respectively. Therefore, in a state where the X-direction tilt sensor 47 and the Y-direction tilt sensor 48 detect the horizontality respectively, the two-axial tilt unit 44 becomes horizontal.

The tilt setting arms 51 and 52 extend from the two-axial tilt unit 44 in the two directions of the X-direction and the Y-direction, respectively. FIG. 6 shows only the tilt setting arm 51 extending in the X-direction. Further, in the following, a description will be given on a tilt setting in the X-direction.

The slider unit 3 of the slide guide 1 is provided so that the slider unit 3 can move in an optical axis direction of the projecting optical system 36 (i.e., in a rotary axis direction of the rotary projecting unit 38).

A tilting pin 53 is erected from the slider unit 3 and the tilting pin 53 is engaged with the tilt setting arm 51. A spring 54, by which the tilt setting arm 51 is biased, is provided to the two-axial tilt unit 44 so that the tilt setting arm 51 engages with the tilting pin 53 at all times.

A description will be given on a case where the laser reference plane is tilted at a predetermined angle from a state where the surveying instrument 31 is horizontally leveled.

In the state where the surveying instrument 31 is horizontally leveled, the X-direction tilt sensor 47 and the Y-direction tilt sensor 48 both detect the horizontality.

The tilt setting motor 45 is driven and the slider unit 3 is moved by an amount corresponding to a predetermined angle. For instance, the slider unit 3 is moved upwards in FIG. 6. A movement amount of the slider unit 3 is detected by a linear position detector 9.

The tilt setting arm 51 tilts upwards via the tilting pin 53 and the two-axial tilt unit 44 rotates in a clockwise direction in FIG. 6 around the tilt fulcrum 46 as a center integrally with the tilt setting arm 51 and tilts at the predetermined angle.

Next, the main unit frame 39 is tilted at the predetermined angle in a counterclockwise direction with the X-axis 41 as a center by a tilting device (not shown). By setting in a state where the horizontality is detected by the X-direction tilt sensor 47 and the Y-direction tilt sensor 48, the rotary axis of the rotary projecting unit 38 can be tilted at the predetermined angle in the X-direction.

By tilting the rotary axis of the rotary projecting unit 38 at the predetermined angle in the X-direction, the laser reference plane formed by the laser beam 34 tilts at the predetermined angle in the X-direction.

As described above, since the slider unit 3 smoothly moves with the high linearity with respect to the guide unit 2, a tilt of the two-axial tilt unit 44 can be set with high accuracy.

It is to be noted that the slide guide unit according to the present invention is not limited to surveying instruments and can be also applied to an X-Y table which requires high accuracy.

The invention claimed is:

1. A slide guide unit comprising; a guide base having V-grooves formed on both the side end faces in parallel, a slide block having a facing surface facing one of said V-grooves on both the side ends, conical recesses formed at two positions on said facing surface facing said one V-groove with a predetermined interval, first steel balls fitted in said conical recesses and fitted in said one V-groove, a steel ball support plate with spring action as disposed on a side surface of said slide block on said other V-groove side and a necessary number of second steel balls as fitted in a steel ball holding groove and said other V-groove, wherein said steel ball support plate has said steel ball holding groove facing said other V-groove, wherein said steel ball support plate presses said second steel balls to said other V-groove and said slide block is movable along said one V-groove side and said other V-groove side via said first steel balls and said second steel balls.

2. The slide guide unit according to claim 1, wherein said steel ball holding groove has folding pieces for preventing from falling at both the ends of said groove and said second steel balls are provided in said steel ball holding groove in an appressed state or a substantially appressed state.

3. The slide guide unit according to claim 1, wherein said steel ball holding groove has folding pieces for preventing from falling at both the ends of said groove, a compression spring is provided between said second steel balls and said second steel balls are provided in said steel ball holding groove in an appressed state by a force of said compression spring.

4. The slide guide unit according to claim 1, wherein said steel ball support plate is fixed to said slide block by a fixing bolt which is positioned at a position away from said steel ball holding groove and an adjusting bolt which is positioned at a position close to said steel ball holding groove, said steel ball support plate presses said second steel balls to said other V-groove and a pressing force of said steel ball support plate is adjusted by said adjusting bolt.

5. The slide guide unit according to claim 1, wherein a linear position detector is provided on a surface of said guide base facing said slide block, a light emitting element for emitting a detection light to said linear position detector is provided on said slide block and a relative position of a slider unit with respect to a guide unit is detected based on a detection result of said detection light of said linear position detector.

6. A surveying instrument which projects a laser beam in rotary irradiation and forms a laser reference plane, comprising a tilt setting device for setting a tilt angle of the laser reference plane, wherein said tilt setting device comprises a two-axial tilt unit which is tiltable in horizontal two directions and has tilt sensors which detect a horizontality of the horizontal two directions, two tilt setting arms extending from said two-axial tilt unit in the horizontal two directions and one of said slide guide units according to claim 1 which engages with the tilt setting arms respectively, and wherein each slide guide unit is configured to displace said engaged tilt setting arms in a vertical direction and set said tilt setting arms to a predetermined tilt.

7. The slide guide unit according to claim 2, wherein said steel ball support plate is fixed to said slide block by a fixing bolt which is positioned at a position away from said steel ball holding groove and an adjusting bolt which is positioned at a position close to said steel ball holding groove, said steel ball support plate presses said second steel balls to said other V-groove and a pressing force of said steel ball support plate is adjusted by said adjusting bolt.

8. The slide guide unit according to claim 3, wherein said steel ball support plate is fixed to said slide block by a fixing bolt which is positioned at a position away from said steel ball holding groove and an adjusting bolt which is positioned at a position close to said steel ball holding groove, said steel ball support plate presses said second steel balls to said other V-groove and a pressing force of said steel ball support plate is adjusted by said adjusting bolt.

9. The slide guide unit according to claim 2, wherein a linear position detector is provided on a surface of said guide base facing said slide block, a light emitting element for emitting a detection light to said linear position detector is provided on said slide block and a relative position of a slider unit with respect to a guide unit is detected based on a detection result of said detection light of said linear position detector.

10. The slide guide unit according to claim 3, wherein a linear position detector is provided on a surface of said guide base facing said slide block, a light emitting element for emitting a detection light to said linear position detector is provided on said slide block and a relative position of a slider unit with respect to a guide unit is detected based on a detection result of said detection light of said linear position detector.

11. A surveying instrument which projects a laser beam in rotary irradiation and forms a laser reference plane, comprising a tilt setting device for setting a tilt angle of the laser reference plane, wherein said tilt setting device comprises a two-axial tilt unit which is tiltable in horizontal two directions and has tilt sensors which detect a horizontality of the horizontal two directions, two tilt setting arms extending from said two-axial tilt unit in the horizontal two directions and one of said slide guide units according to claim 2 which engages with the tilt setting arms respectively, and wherein each slide guide unit is configured to displace said engaged tilt setting arms in a vertical direction and set said tilt setting arms to a predetermined tilt.

12. A surveying instrument which projects a laser beam in rotary irradiation and forms a laser reference plane, comprising a tilt setting device for setting a tilt angle of the laser reference plane, wherein said tilt setting device comprises a two-axial tilt unit which is tiltable in horizontal two directions and has tilt sensors which detect a horizontality of the horizontal two directions, two tilt setting arms extending from said two-axial tilt unit in the horizontal two directions and one of said slide guide units according to claim 3 which engages with the tilt setting arms respectively, and wherein each slide guide unit is configured to displace said engaged tilt setting arms in a vertical direction and set said tilt setting arms to a predetermined tilt.

13. A surveying instrument which projects a laser beam in rotary irradiation and forms a laser reference plane, comprising a tilt setting device for setting a tilt angle of the laser reference plane, wherein said tilt setting device comprises a two-axial tilt unit which is tiltable in horizontal two directions and has tilt sensors which detect a horizontality of the horizontal two directions, two tilt setting arms extending from said two-axial tilt unit in the horizontal two directions and one of said slide guide units according to claim 4 which engages with the tilt setting arms respectively, and wherein each slide guide unit is configured to displace said engaged tilt setting arms in a vertical direction and set said tilt setting arms to a predetermined tilt.

14. A surveying instrument which projects a laser beam in rotary irradiation and forms a laser reference plane, comprising a tilt setting device for setting a tilt angle of the laser reference plane, wherein said tilt setting device comprises a two-axial tilt unit which is tiltable in horizontal two directions and has tilt sensors which detect a horizontality of the horizontal two directions, two tilt setting arms extending from said two-axial tilt unit in the horizontal two directions and one of said slide guide units according to claim 7 which engages with the tilt setting arms respectively, and wherein each slide guide unit is configured to displace said engaged tilt setting arms in a vertical direction and set said tilt setting arms to a predetermined tilt.

15. A surveying instrument which projects a laser beam in rotary irradiation and forms a laser reference plane, comprising a tilt setting device for setting a tilt angle of the laser reference plane, wherein said tilt setting device comprises a two-axial tilt unit which is tiltable in horizontal two directions and has tilt sensors which detect a horizontality of the horizontal two directions, two tilt setting arms extending from said two-axial tilt unit in the horizontal two directions and one of said slide guide units according to claim 8 which engages with the tilt setting arms respectively, and wherein each slide guide unit is configured to displace said engaged tilt setting arms in a vertical direction and set said tilt setting arms to a predetermined tilt.

16. A surveying instrument which projects a laser beam in rotary irradiation and forms a laser reference plane, comprising a tilt setting device for setting a tilt angle of the laser reference plane, wherein said tilt setting device comprises a two-axial tilt unit which is tiltable in horizontal two directions and has tilt sensors which detect a horizontality of the horizontal two directions, two tilt setting arms extending from said two-axial tilt unit in the horizontal two directions and one of said slide guide units according to claim 9 which engages with the tilt setting arms respectively, and wherein each slide guide unit is configured to displace said engaged tilt setting arms in a vertical direction and set said tilt setting arms to a predetermined tilt.

17. A surveying instrument which projects a laser beam in rotary irradiation and forms a laser reference plane, comprising a tilt setting device for setting a tilt angle of the laser reference plane, wherein said tilt setting device comprises a two-axial tilt unit which is tiltable in horizontal two directions and has tilt sensors which detect a horizontality of the horizontal two directions, two tilt setting arms extending from said two-axial tilt unit in the horizontal two directions and one of said slide guide units according to claim 10 which engages with the tilt setting arms respectively, and wherein each slide guide unit is configured to displace said engaged tilt setting arms in a vertical direction and set said tilt setting arms to a predetermined tilt.

18. A surveying instrument which projects a laser beam in rotary irradiation and forms a laser reference plane, comprising a tilt setting device for setting a tilt angle of the laser reference plane, wherein said tilt setting device comprises a two-axial tilt unit which is tiltable in horizontal two directions and has tilt sensors which detect a horizontality of the horizontal two directions, two tilt setting arms extending from said two-axial tilt unit in the horizontal two directions and one of said slide guide units according to claim 5 which engages with the tilt setting arms respectively, and wherein each slide guide unit is configured to displace said engaged tilt setting arms in a vertical direction and set said tilt setting arms to a predetermined tilt.

* * * * *